May 27, 1958   C. O. KREUTZER   2,836,735
IMPULSE GENERATOR FOR ELECTRIC FISHING
Filed March 24, 1954   2 Sheets-Sheet 1

INVENTOR:
CONRADIN OTTO KREUTZER
BY
Richardson, David and Nardon
ATTORNEYS.

May 27, 1958     C. O. KREUTZER     2,836,735
IMPULSE GENERATOR FOR ELECTRIC FISHING

Filed March 24, 1954     2 Sheets-Sheet 2

*INVENTOR.*
CONRADIN OTTO KREUTZER

BY *Arthur H Robert*

ATTORNEY

United States Patent Office 2,836,735
Patented May 27, 1958

2,836,735

IMPULSE GENERATOR FOR ELECTRIC FISHING

Conradin Otto Kreutzer, Goteborg, Ekedalsgatan, Sweden, assignor to Fish Products Company, Lewes, Del., a corporation of Delaware Application March 24, 1954, Serial No. 418,377

15 Claims. (Cl. 307—110)

The present invention relates to a pulse generator for generating electrical impulses for use in electrical fishing, the impulses being applied by means of suitable electrodes to the water in which the fish are swimming, the impulse generator ordinarily being carried aboard a fishing vessel.

An object of the invention is the provision of an impulse generator of this character in which the impulses may be independently varied both with respect to the frequency of their repetition rate and with respect to the duration of successive impulses.

A further object of the invention is the provision of means for converting electrical energy from the usual direct current power supply system of a fishing vessel into a series of impulses suitable for use in electrical fishing, the converting means being arranged to provide selectively either unidirectional impulses or impulses of alternating polarity, as desired.

Still another object of the invention is the provision of an impulse generator using the discharge of a capacitor which is successively charged in opposite directions, current limiting means being provided to limit the initial peak charging or discharge current to prevent damage to the switch contacts which control the charging and discharging connections.

A further object of the invention is to provide a generator of this character in which ignitrons are employed to obtain impulse currents of relatively high power.

Other and further objects will become apparent upon reading the following specification, together with the accompanying drawing forming a part hereof.

Referring to the drawing.

Figure 1:
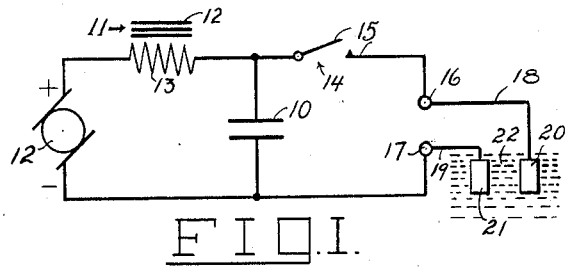
Fig. 1 is a schematic circuit diagram of a conventional impulse generator.

Referring to Fig. 1, there is shown a conventional impulse generator. In the conventional impulse generator, a capacitor 10 is charged through an inductor designated generally as 11 from a direct current generator 12. The inductor 11 comprises a magnetizable core 12 and a current carrying winding 13. A switch 14 is periodically actuated by any desired means (not shown) so that its contacts 15 repeatedly connect the capacitor 10 to load terminals 16 and 17. Load terminals 16 and 17 are connected via conductors 18 and 19, respectively, to fishing electrodes 20 and 21 which are shown immersed in water 22 which is being fished. A more detailed description of this conventional apparatus appears in the periodical publication "Archiv für Fischereiwissenschaft," vol. 5 (1954 Nos. 3 and 4), pp. 132–134.

In the case of a generator which delivers impulses of relatively high power, the switch 14 is replaced by a periodically fired ignitron.

The conventional impulse generator of Fig. 1, presents certain disadvantages. The load circuit comprising the electrodes 20 and 21 which are connected to terminals 16 and 17 must include a certain minimum amount of inductance if it is desired that the discharge of capacitor 10 shall be of an oscillatory nature. Because of the inherent relatively large dimensions for the discharge circuit which extends through the fishing electrodes 20 and 21 the geometrical inductance alone of this circuit may be sufficient to obtain an oscillatory discharge without the provision of a separate inductor for this purpose. In this case, the oscillatory discharge current has an inherent passage through zero which causes the ignitron to become extinguished, if an ignitron is being used. In order to prevent the generator 12 from distorting the desired pulse form by supplying the load directly through the switch 14, this switch must operate at a repetition rate which is determined by and in synchronism with the natural period of an oscillatory circuit consisting of the series combination of inductor 11 and the capacitor 10. If it is desired to change the frequency of the pulse repetition rate, the value of the inductance of inductor 11 must be varied either by using a variable inductor or by replacing the inductor 11 by another inductor of variable inductance. If it is desired to change the pulse duration by increasing or decreasing the capacitance of capacitor 10, the resonant frequency of inductor 11 and capacitor 10 is altered, requiring a corresponding change in the pulse repetition rate. Additionally, in practice, pulses of alternating polarities are required. Furthermore, in practice, it must be possible to vary the pulse duration and pulse repetition rates independently of each other.

Figure 2:
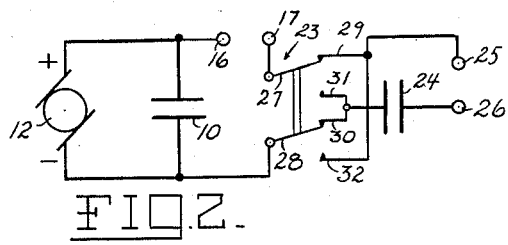
Fig. 2 is a schematic circuit diagram of an impulse generator in accordance with the invention.

The impulse firing circuit shown in Fig. 2 meets these practical requirements with respect to selective availability of either unidirectional pulses or pulses of alternating polarities, together with independent adjustability of pulse duration and of pulse repetition rate.

The direct current generator 12 is connected directly to a storage capacitor 10. Capacitor 10 serves to provide a source of heavy pulse currents of short duration independently of the ability of the direct current generator 12 to supply currents of this character. A reversing switch designated generally as 23 operates periodically in accordance with the desired pulse repetition rate like the switch 14 of Fig. 1. Reversing switch 23 charges a pulsing capacitor 24 from the storage capacitor 10, first in one direction and then in the opposite direction in accordance with the periodic actuations of reversing switch 23.

Load terminals 16 and 17 provide unidirectional impulses. When load terminals 16 and 17 are in use, load terminals 25 and 26 are short circuited.

Figure 5:
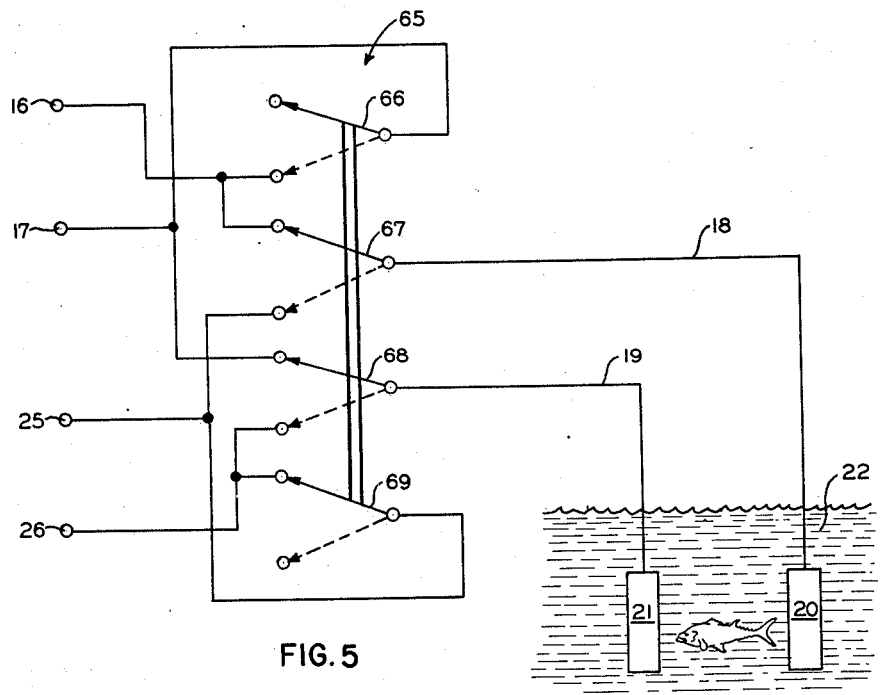
Figure 5 illustrates a switching circuit for use with the pulsing apparatus of any of Figs. 2, 3 or 4 for selectively connecting the pulsing apparatus to deliver a series of unidirectional impulses to the fishing electrodes or to deliver successive impulses of opposite polarities, as desired.

Load terminals 25 and 26 provide pulses of alternating polarities. When load terminals 25 and 26 are in use, load terminals 16 and 17 are short circuited. Suitable switching means may be provided as shown in Fig. 5 to connect the load conductors 18 and 19 selectivity to load terminals 16 and 17 or to load terminals 25 and 26 at will, the unused pair of load terminals being short circuited by the switching means. Other switching arrangements suitable for this purpose are known in the art, the switch of Fig. 5 being shown only by way of illustration.

The reversing switch 23 is shown provided with two movable contact arms 27 and 28. In the switch position shown in the drawing, positive potential is applied from contact arm 27 and a stationary contact 29 through terminals 25 and 26, which are either short circuited or which supply the load circuit, to the right hand side of pulsing capacitor 24. The contact arm 28 engages a stationary contact 30 and applies negative potential to the left hand side of pulsing capacitor 24. In this switch position, the circuit fires through a branch circuit including contact arm 27, contact 29, capacitor 24, contact 30 and contact arm 28.

Upon actuation of reversing switch 23 to its other position, contact arm 27 transfers from stationary contact 29 to another stationary contact 31 and contact arm 28 simultaneously transfers from stationary contact 30 to another stationary contact 32. Now, in this switch position, the circuit fires through another branch circuit including contact arm 27, contact 31, capacitor 24, contact 32 and contact arm 28. The polarity of the potential applied to pulsing capacitor 24 is thus reversed, and if capacitor 24 is fully charged, its maximum potential is added to that of the source voltage of generator 12 and storage capacitor 10, thereby doubling the pulse voltage with respect to the source voltage. This allows the use of capacitors 10 and 24 which are designed with dielectric characteristics for operation at the source voltage and which will produce pulse amplitudes of twice the source voltage.

During each firing period of the impulse circuit, at the initial instant of closing the switch 23, the potential of the electrical charge stored in the capacitor 24 is in series with and extends in the same direction as the source voltage. The capacitor 24 thereafter will discharge to zero potential and then charge in the opposite direction. When the capacitor 24 is fully charged, it will oppose and stop the flow of current in the firing circuit, even though the switch contacts remain closed.

Figure 3:
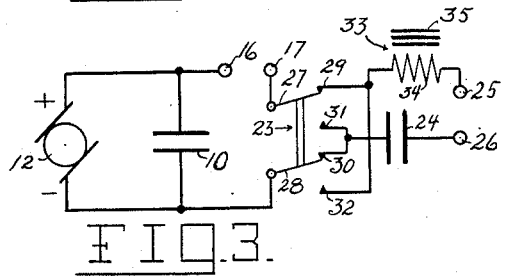
Fig. 3 shows a generator similar to the generator shown in Fig. 2, means being included to limit the initial charging current supplied to the impulse capacitor.

Figure 3 is similar to Fig. 2, except that a current limiting inductor designated generally as 33 has been provided to limit the initial peak current flow through pulsing capacitor 24 in order to protect the contacts of reversing switch 23 when a mechanical type of switch is used. The inductor 33 comprises a current carrying winding 34 connected between load terminal 25 and stationary switch contacts 29—32 of reversing switch 23, the contacts 29—32 being connected together. Inductor 33 further comprises a saturable magnetic core 35 preferably having a sharp knee in its saturation characteristic, whereby its initial inductance without current flow is relatively large with respect to its inductance when a considerable current is flowing through winding 34. In this manner, during the initial charging of pulsing capacitor 24, the peak charging current is limited by inductor 33 until core 35 becomes saturated, whereafter inductor 33 has little effect on the charging current. This is also true under discharge conditions when the load resistance is so low that it has little limiting effect on the peak current flow through the pulsing capacitor 24.

By varying the capacitance of pulsing capacitor 24, the impulse duration may be determined. By varying the frequency of the periodic operation of reversing switch 23, the frequency of the repetition rate of the impulses may be determined. A variation in one does not necessarily require a variation in the other.

Figure 4:
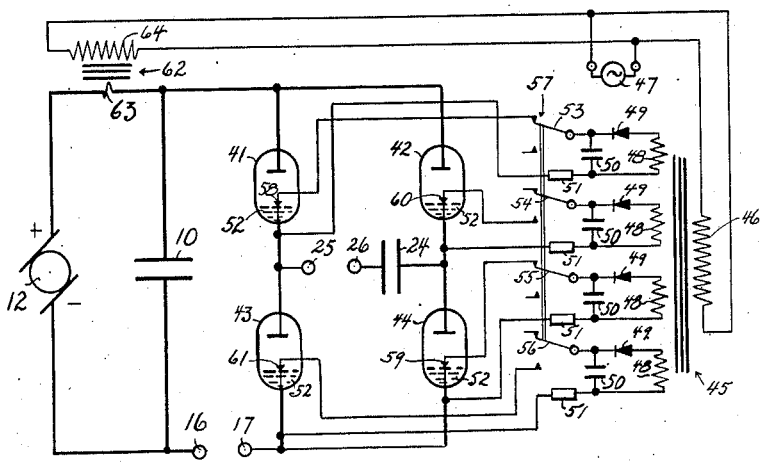
Fig. 4 is similar to Figs. 2 and 3, the mechanical switch being replaced by ignitrons to obtain impulse currents of relatively high power.

In Figure 4, the reversing switch 23 of Figs. 2 and 3 have been replaced by two pairs of serially connected ignitrons or arc-type tubes, 41—43 and 42—44. A transformer 45 is shown with its primary winding 46 connected to a source of alternating current 47 and is provided with four similar independent secondary windings 48. Each secondary winding is connected to a half-wave rectifier 49 and a capacitor 50. The negative terminal of each capacitor is shown connected through a resistor 51 to the cathode 52 of one of the ignitrons 41 to 44. The positive terminal of each capacitor is connected to one of four movable contact arms 53 to 56 of a four-pole double throw switch 57 which may be actuated periodically by any desired means at a frequency which is determinative of the repetition rate of the impulses. With the switch 57 in the position shown in the drawing, switch arm 53 applies positive potential to the control electrode 58 of ignitron 41, causing ignitron 41 to be conductive. Similarly, switch arm 55 applies positive potential to the control electrode 59 of ignitron 44, causing ignitron 44 to be conductive like ignitron 41. Current from source 12—10 flows through pulsing capacitor 24 charging its left hand side to a positive potential through load terminals 25—26 and its right hand side to a negative potential through load terminals 16—17, conductivity being maintained through both sets of load terminals, as described above and shown in greater detail in Fig. 5. The control electrodes 60 and 61 of ignitrons 42 and 43 are unaffected by switch 57 at this time and these ignitrons are therefore non-conductive. Accordingly, the circuit fires through a branch circuit including ignitron 41, capacitor 24 and ignitron 44. Once both of the ignitrons are concurrently triggered, each will remain conductive as long as the firing circuit current flowing through each ignitron maintains the potential across each ignitron above its extinguishing voltage. Thus, the capacitor 24 will become substantially fully charged before the ignitrons 41 and 44 become non-conductive.

When switch 57 is actuated, control electrodes 58 and 59 of ignitrons 41 and 44 are disconnected from the sources of positive potential previously connected thereto, and ignitrons 41 and 44 thereupon become non-conductive. Switch arm 54 applies positive potential to control electrode 60 of ignitron 42 and switch arm 56 applies positive potential to the control electrode 61 of ignitron 43. Ignitrons 42 and 43 thereupon become conductive, and the direction of current flow through impulse capacitor 24 is thereupon reversed with respect to its former direction. The impulse circuit now fires through a branch circuit including ignitron 42, capacitor 24 and ignitron 43. During each firing period the capacitor 24 is first discharged to zero and then charged in the opposite direction to oppose the flow of charging current in the firing circuit. The circuit will continue firing until the potential across the ignitrons 42 and 43 drops below their extinguishing voltages to cause them to become non-conductive. The operation of the pulse generating circuit of Fig. 4 is thus similar to that of Figs. 2 and 3.

In order to assist the ignitrons 41 to 44 in becoming non-conductive when their control electrodes 58, 60, 61 and 59, respectively, are disconnected from the positive potential sources, a transformer 62 is shown with its secondary winding 63 connected in series with the common anode-cathode circuits of the ignitrons to add an alternating potential component to the source voltage provided by generator 12 and storage capacitor 10. The primary winding 64 of transformer 62 is energized from alternating current source 47. This alternating potential component provides peaks of reduced potential which assist in extinguishing a previously conductive ignitron and peaks of increased potential which assist in the firing of a previously non-conductive ignitron.

Figure 6:
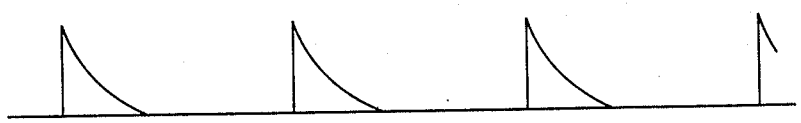
Figure 6 is a waveform diagram of the output current delivered to the fishing electrodes with the switch of Fig. 5 in one of its two positions.
Figure 7:
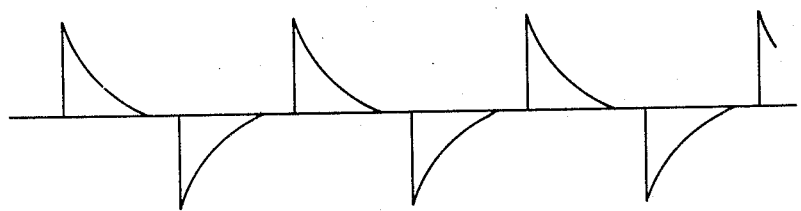
Figure 7 is a waveform diagram of the output current delivered to the fishing electrodes with the switch of Fig. 5 in the other of its two positions.

Fig. 5 shows a switching arrangement by means of which the load terminals 16 and 17 of any of Figs. 2, 3 or 4 may be connected to the fishing electrodes 20 and 21 with the unused pair of load terminals 25 and 26 short circuited for the production of unidirectional impulses as shown in Fig. 6 or operated to connect the fishing electrodes 20 and 21 to load terminals 25 and 26 for obtaining fishing impulses of alternating polarities as shown in Fig. 7 with load terminals 16 and 17 short circuited.

In Fig. 5, there is shown a four-pole two-position switch designated generally as 65 which is connected to the two pairs of load terminals 16—17 and 25—26 and to the fishing electrodes 20 and 21, these same load terminals also being shown in each of Figs. 2, 3 and 4.

With switch 65 in the position shown in Fig. 5, the first pole 66 is open. The second pole 67 connects output terminal 16 to fishing electrode 20 via conductor 18. The third pole 68 connects output terminal 17 to fishing electrode 21 via conductor 19. The fourth pole short circuits output terminals 25 and 26. Unidirectional impulses are therefore delivered to the fishing electrodes 20 and 21, as shown in Fig. 6, the initial voltage being twice that of storage capacitor 10 as described above.

With switch 65 operated to its other position as indicated in dotted lines, the first pole 66 short circuits output terminals 16 and 17. The second pole 67 connects output terminal 25 to fishing electrode 20 via conductor 18. The third pole 68 connects output terminal 26 to fishing electrode 21 via conductor 19. The fourth pole is open. Impulses of alternating polarities are thus delivered to the fishing electrodes 20 and 21 as shown in Fig. 7, the initial voltage in each direction being substantially twice that of storage capacitor 10 which becomes charged during the flow of each impulse of fishing current therethrough.

In Figs. 6 and 7 the frequency of operation of reversing switch 23 of Fig. 2 or Fig. 3 or switch 57 of Fig. 4 is assumed to be the same as well as the capacitance of impulse capacitor 24 and the voltage of storage capacitor 10. As a result there are unused intervals in Fig. 6 which are utilized in Fig. 7. These unused intervals in Fig. 6 may be utilized, if desired, by increasing the frequency of operation of the switch 23 or 57, by increasing the capacitance of impulse capacitor 24 to extend the discharge time, or by increasing the voltage of storage capacitor 10 to extend the discharge time by the use of an increased initial voltage with the same discharge rate.

It will be apparent to those skilled in the art that many changes and modifications may be made in the specific illustrative embodiments which are herein shown and described without departing from the scope of the invention as defined in the appended claims.

What is claimed is:

1. An impulse generator of the class described, comprising: a direct current source; a pulsing capacitor; periodically actuated reversing switch means connected to charge said capacitor from said source successively in opposite directions; and a pair of load terminals connected intermediate said capacitor and said source for the flow of the charging current of said capacitor therethrough.

2. A generator according to claim 1, in which said load terminals are connected intermediate said source and said reversing switch means.

3. A generator according to claim 1, in which said load terminals are connected intermediate said reversing switch means and said impulse capacitor.

4. A generator according to claim 1, wherein said reversing switch means comprises two pairs of serially connected discharge means, each having an anode, a cathode and a control electrode, said impulse capacitor being connected to the junction points between discharge means in each serially connected pair, each of said discharge means being connected for current flow therethrough from said direct current source, and means periodically connecting said control electrodes to cause conduction alternately through each of the discharge devices of each pair, one discharge device of each pair being simultaneously conductive, each conductive discharge device being connected to apply a potential of different polarity from said source to said capacitor.

5. A generator according to claim 4, in which said load terminals are connected intermediate said source and said reversing switch means.

6. A generator according to claim 4, in which said load terminals are connected intermediate said reversing switch means and said impulse capacitor.

7. A generator according to claim 4, further comprising circuit means energized from an alternating current source and connected to said direct current source, said circuit means adding a component of alternating potential to the voltage of said direct current source.

8. A generator according to claim 1, further comprising a current limiting inductor included in said charging connection of said capacitor to said source, said inductor limiting the peak current flow in said capacitor.

9. A generator according to claim 1, in which a storage capacitor is included in said source.

10. A fishing device of the class described, comprising: a direct current source; a pulsing capacitor; periodically actuated reversing switch means connected to charge said pulsing capacitor from said source alternately in opposite directions; a first pair of load terminals connected intermediate said source and said switching means; a second pair of load terminals connected intermediate said switching means and said pulsing capacitor, one of said pairs of load terminals being short circuited when the other pair is in use; and a pair of fishing electrodes connected to said other pair of load terminals.

11. An electro-fishing apparatus comprising: an impulse-firing circuit having a source of electrical energy and serially containing a first pair of switches connected to each other through a capacitor, said circuit operating initially to fire when both switches are closed and the polarity of the capacitor is in a direction such as to add its voltage to the source voltage; and means for periodically causing both switches to be closed concurrently when the polarity of said capacitor is in the voltage adding direction.

12. The apparatus of claim 11 wherein: said circuit continues to fire until said capacitor is discharged and then recharged in the opposite direction to reverse its polarity.

13. The apparatus of claim 12 wherein: said capacitor is operative, when fully recharged, to stop the flow of firing current.

14. The apparatus of claim 12 wherein: said firing circuit serially contains a second pair of switches, connected to each other through said capacitor in a manner such as to reverse the connections of said capacitor in said firing circuit, and is operative to fire through said second pair of switches when said second pair are closed and said capacitor polarity is reversed; and said switch closing means operates periodically to close said second pair of switches alternately to said first pair.

15. The apparatus of claim 12 wherein: said switches are in the form of normally non-conductive arc-type tubes; said switches are closed when both tubes become concurrently conductive; and said switch closing means is operative to trigger both tubes substantially concurrently into momentary conductivity by flowing an electrical current through each tube for a relatively short period of time.

References Cited in the file of this patent

UNITED STATES PATENTS

| | | |
|---|---|---|
| 568,176 | Tesla | Sept. 22, 1896 |
| 1,610,971 | Ruben | Dec. 14, 1926 |
| 2,384,830 | Garstang | Sept. 18, 1945 |
| 2,508,708 | Dawson | May 23, 1950 |